United States Patent [19]

Kirschner

[11] 4,451,912
[45] May 29, 1984

[54] RECORD EXTRACTION MECHANISM FOR DISC PLAYER

[75] Inventor: Thomas F. Kirschner, Indianapolis, Ind.

[73] Assignee: RCA Corporation, New York, N.Y.

[21] Appl. No.: 374,378

[22] Filed: May 3, 1982

[51] Int. Cl.³ ............................................. G11B 25/04
[52] U.S. Cl. .................................................. 369/77.2
[58] Field of Search ........................... 369/75, 77, 77.2

[56] References Cited

U.S. PATENT DOCUMENTS

| | | | |
|---|---|---|---|
| 4,098,511 | 7/1978 | Leedom | 369/77.2 |
| 4,124,866 | 11/1978 | Coleman | 358/128 |
| 4,133,540 | 1/1979 | Torrington | 369/77.2 |
| 4,226,424 | 10/1980 | Gordon | 369/77.2 |
| 4,239,108 | 12/1980 | Coleman et al. | 206/312 |
| 4,239,238 | 12/1980 | Coleman | 369/77.2 |
| 4,272,083 | 6/1981 | Torrington | 369/77 |

FOREIGN PATENT DOCUMENTS

| | | | |
|---|---|---|---|
| 57-176562 | 10/1982 | Japan | 369/77.2 |
| 2064199 | 6/1981 | United Kingdom . | |
| 2087127 | 5/1982 | United Kingdom | 369/77.2 |
| 2098380 | 11/1982 | United Kingdom | 369/77.2 |

Primary Examiner—Steven L. Stephan
Attorney, Agent, or Firm—E. M. Whitacre; J. S. Tripoli; D. A. Kulkarni

[57] ABSTRACT

A video disc player has a record extraction mechanism to facilitate record loading and unloading while the record remains enclosed in its caddy. The caddy comprises a record retaining spine releasably secured to an outer sleeve by means of a pair of spine locking fingers extending from the opposite edges thereof. A pair of spine releasing members engage and deflect the spine locking fingers to release the spine from its sleeve when a caddy is inserted into the player. Simultaneously, a pair of spine latching members hookingly engage the spine to hold it in place so that the record/spine assembly is retained inside the player when the sleeve is withdrawn. When the sleeve is reinserted into the player to recapture the record/spine assembly, it engages and drives the spine releasing members against the spine latching members in a manner freeing the spine. The caddy is then extracted. The spine releasing members and the spine latching members are both mounted on a shaft which is disposed at right angles to, and spaced apart from, the caddy insertion path.

12 Claims, 14 Drawing Figures

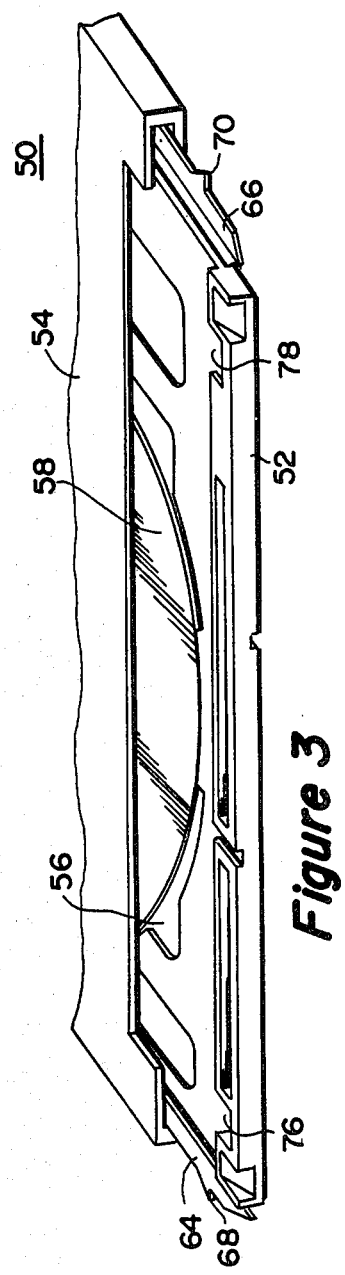
Figure 3
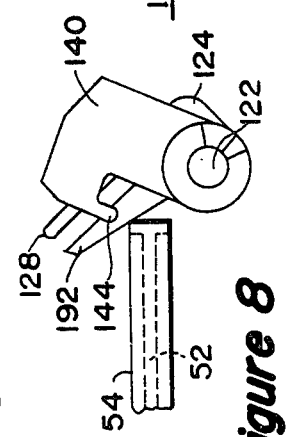
Figure 7
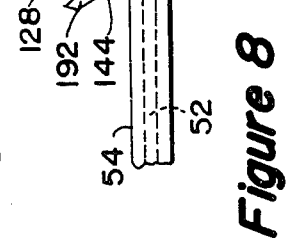
Figure 8
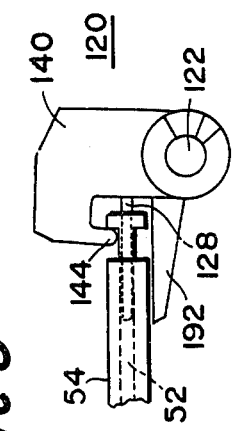
Figure 5
Figure 6

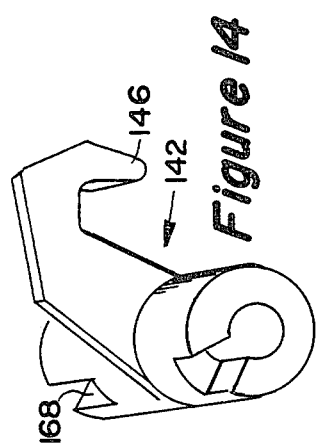
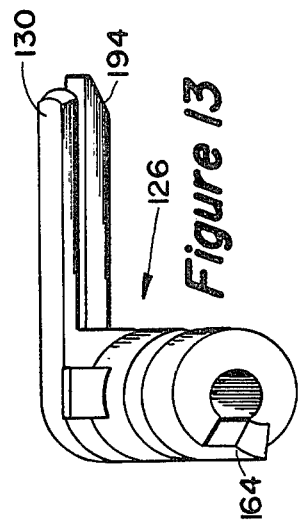

RECORD EXTRACTION MECHANISM FOR DISC PLAYER

This invention relates to a record playback system, and more particularly, it relates to a mechanism for loading a record into a record player while the record remains enclosed in its caddy.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver.

It is beneficial to enclose a video record in a caddy which comprises a record retaining spine removably located within an outer jacket or sleeve. The record retaining spine has an opening in which a record is received to form a record/spine assembly. The record retaining spine is provided with a pair of spaced apart locking fingers disposed at the opposite edges thereof to releasably secure the spine to the sleeve. For record loading, a full caddy is inserted into an input slot provided in the player along a path defined by a pair of caddy guide rails. A record extraction mechanism disposed in the player removes the record/spine assembly from the sleeve when the sleeve is withdrawn to leave the record inside the player resting on a set of record receiving pads. The retained record is then transferred to the turntable for playback. For record retrieval, the record is transferred back to the receiving pads, and an empty jacket is reinserted into the player to recapture the record/spine assembly. U.S. Pat. Nos. 4,239,108 and 4,226,424, respectively, illustrate a video disc caddy and a record extraction mechanism suitable for use therewith.

The record extraction mechanism in U.S. Pat. No. 4,226,424 comprises a pair of pivotally-mounted spaced apart pry bars which protrude into the sleeve and deflect the spine locking fingers to release the spine from the sleeve as a caddy is inserted into the player. Simultaneously, a pair of pivotally-mounted spaced-apart hooks enter into the respective slots provided in the spine to lock it to the player, so that when the sleeve is removed, the record/spine assembly is held inside the player. A pair of springs bias the hook into latching engagement with the spine. A second pair of springs connect the pry bars and the hooks together to allow the pry bars to rotate away from the spine in response to the deflection of the hooks by the spine, when the sleeve is withdrawn. When an empty sleeve is reinserted into the player to recapture the record/spine assembly, it engages the deflected pry bars and presses them against the hooks in a manner freeing the spine. The caddy is then extracted from the player.

In the mechanism disclosed in U.S. Pat. No. 4,226,424, the two hooks are disposed on a U-shaped frame which is pivotally mounted near the back end of the player about a first axis which is disposed at right angles to the caddy insertion path. The pry bars are rotatably mounted in the housing about a second axis which is parallel to and spaced apart from the first axis. The two pry bars are connected together by a cross member to ensure that they operate in unison. Such configuration of the record extraction mechanism utilizes a large amount of space in the player instrument.

In a modified version of the above record extraction mechanism, both the pry bars and the hooks are mounted on a single cross shaft located at the back end of the player in the plane of the caddy insertion path. When a caddy is inserted into the player, the spine is released from its sleeve by the pry bars and secured to the player by the hooks, so that the record/spine assembly is maintained inside the player when the sleeve is extracted. The springs connecting the pry bars and the hooks together cause the pry bars to move away from the spine in response to the displacement of the hooks by the spine, as the sleeve is withdrawn. An empty sleeve, reinserted into the player to retrieve the record/spine assembly, contact the deflected pry bars and forces them against the hooks to free the spine. The caddy is then removed.

Although the modified record extraction mechanism facilitates a more compact player design, a malfunction may arise. The deflection of the hooks caused by the spine locked inside the player, and, in turn, the deflection of the pry bars when the sleeve is extracted from the player, is limited to about half the thickness of the spine. Because of the limited deflection of the pry bars, it is possible that they might reenter the sleeve when the sleeve is reinserted into the player, instead of being displaced away from the spine to cause the hooks to disengage the spine. The reentry of the pry bars into the sleeve precludes record retrieval.

The record extraction mechanism, according to this invention, not only overcomes the afore-mentioned potential malfunction problem, but it also provides a compact player design. In the subject mechanism, the spine releasing members and the spine latching members are both pivotally mounted at the back end of the player on a cross shaft that is offset from the caddy insertion path. The spine releasing members have ends disposed in the caddy insertion path, which engage and deflect the respective spine locking fingers to release the spine from the sleeve when a caddy is inserted into the player. The spine latching members, also mounted on the offset shaft, have ends which are arranged in the caddy insertion path to hookingly engage the spine to secure it in place when the caddy is inserted into the player, so that the record/spine assembly is retained inside the player upon the subsequent withdrawal of the sleeve. Each of the spine releasing members is connected to the respective one of the spine latching members to cause the spine releasing members to rotate away from the spine in response to the deflection of the latching members by the spine, when the sleeve is extracted. When an empty sleeve is reinserted into the player, it engages the deflected spine releasing members and drives them against the respective spine latching members in a manner freeing the spine, so that the caddy can be retrieved.

Because the spine latching members are mounted on a cross shaft that is spaced apart from the caddy insertion path, the deflection thereof, in response to the engagement with the spine, is not limited to half the thickness of the spine. Instead, a much larger throw of the spine latching members is obtained which positively ensures the removal of the spine releasing members from the caddy insertion path. This, in turn, prevents the spine releasing members from reentering the sleeve when an empty sleeve is reinserted into the player to recapture the record.

A further advantage of the subject record extraction mechanism is the improved latching/unlatching of the spine resulting from the offset location of the cross shaft carrying the spine latching members.

In the drawings:

FIGS. 2 and 3 illustrate a video disc caddy suitable for use with the instant caddy extraction mechanism;

FIGS. 5-8 represent the sequence of operations involved in loading a record into the video disc player of FIGS. 1 and 4;

FIGS. 13 and 14 depict the perspective views of certain components of the instant record extraction mechanism.

Figure 1:
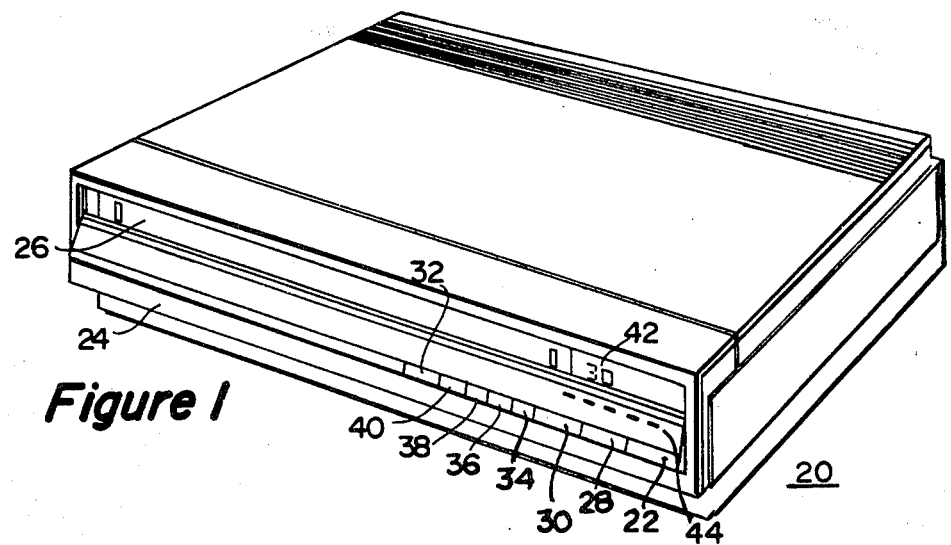
FIG. 1 shows a video disc player incorporating a caddy extraction mechanism in accordance with the subject invention.
Figure 2:
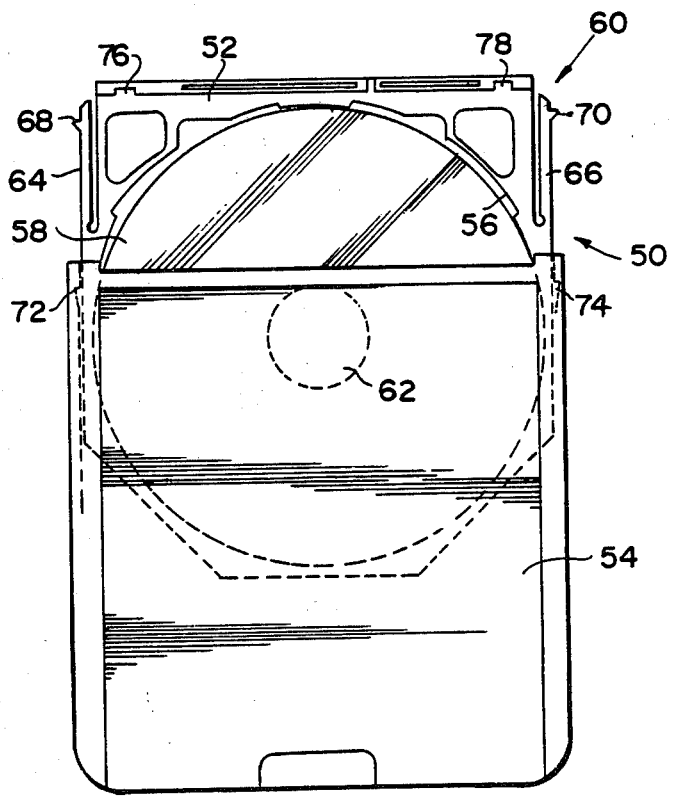
Figure 4:
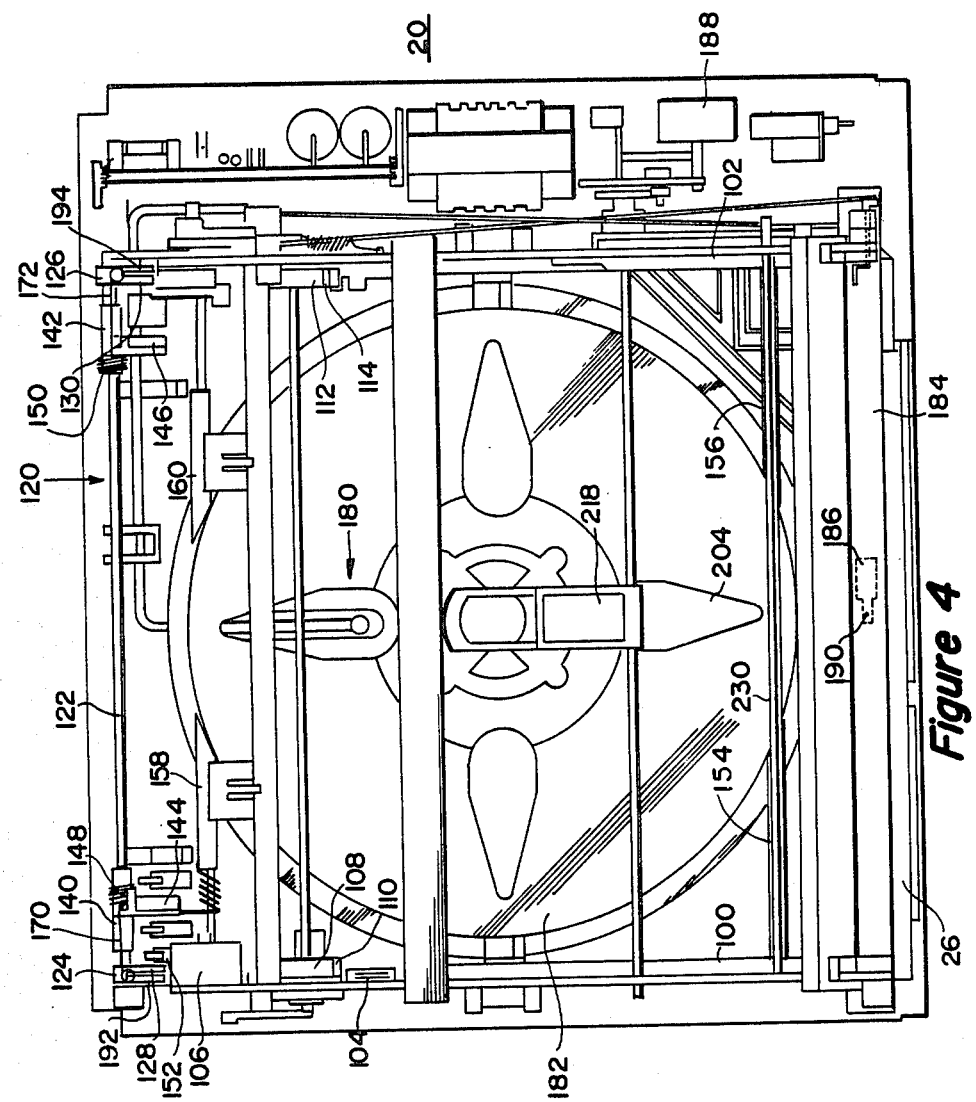
FIG. 4 is a top view of the FIG. 1 video disc player with its lid removed to expose the underlying details.
Figure 10:
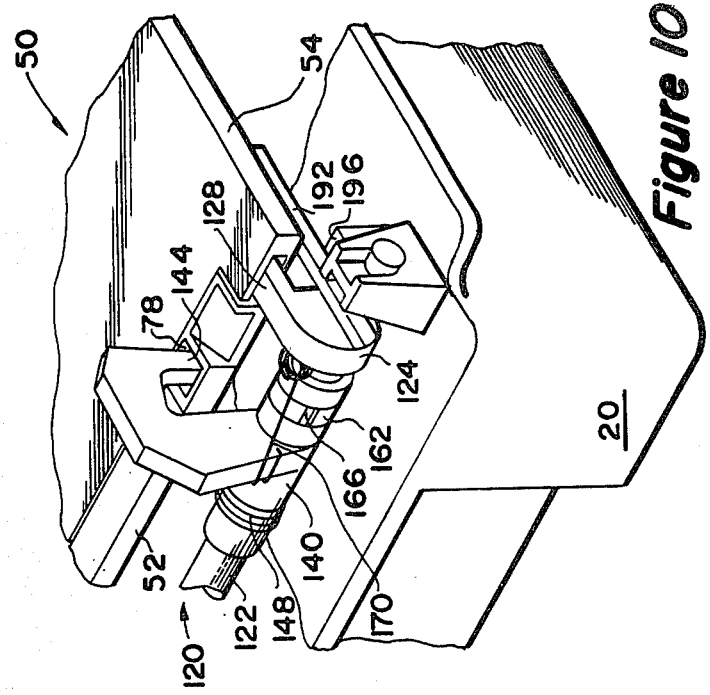
FIGS. 9-12 are perspective views of the present record extraction mechanism corresponding to FIGS. 5-8 respectively.

Shown in FIG. 1 is a video disc player 20 incorporating the subject record extraction mechanism. To play a disc, the player is turned on by pressing the "POWER" button 22 located on the front panel 24. A loaded record caddy, illustrated in FIG. 2, is inserted into the player through a caddy input slot 26, and the caddy sleeve is then extracted leaving the enclosed record inside the player. The record is automatically deposited on the turntable, and played back through a conventional television receiver. At any point during playback, the viewer can reject the remainder of the record by depressing the "REJECT" button 28, or interrupt the program by activating the "PLAY/PAUSE" button 30. The player has a "CHANNEL SELECT" button 32 to select any one of two audio channels in the event of a bilingual program disc. Buttons 34, 36, 38 and 40 permit the user to visually search the record in either direction at two different speeds (e.g., 16 and 120 times the normal playback speed). An LED indicator 42 shows the elapsed playing time. Various player functions—such as SIDE 1-2, CHANNEL A-B, STEREO—are indicated by a plurality of light indicators 44.

The caddy 50, depicted in FIGS. 2 and 3, consists of a planar record retaining spine 52 removably enclosed in a flat outer sleeve 54. The retaining spine 52 has an opening 56 in which a centrally-apertured record 58 is received forming a record/spine assembly 60. Integrally molded with the spine 52 are spine locking fingers 64 and 66 for releasably securing the spine 52 in its sleeve 54. The spine locking fingers 64 and 66 are fitted with protruding elements 68 and 70 which are received in the respective recesses 72 and 74 provided in the sleeve 54 to hold the spine 52 in place. The spine 52 has cutouts 76 and 78 in which the respective spine latching members of the player record extraction mechanism are received to secure the spine to the player for reasons explained later.

To load a record, the caddy 50 is manually inserted into the player through the input slot 26. The player has a set of guide rails 100 and 102 for guiding the caddy insertion. When the caddy 50 actuates a caddy sense switch 104, a function motor 106 is turned on. The function motor 106 drives a set of caddy drive rollers 108, 110, 112 and 114 which, in turn, pull the caddy in.

The player is provided with a record extraction mechanism in accordance with this invention to extract the enclosed record from the caddy without the need for touching the record. The subject record extraction mechanism 120 is now described in conjunction with FIGS. 5-12.

Figure 9:
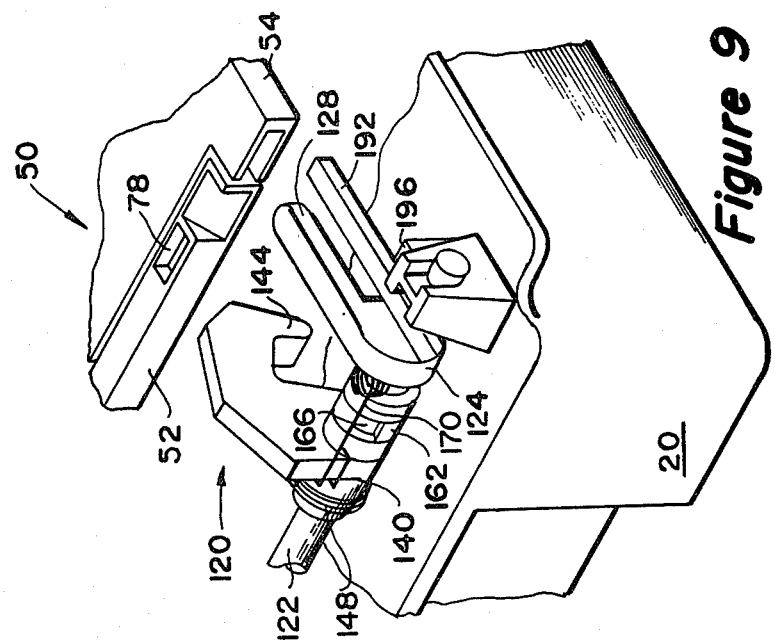

The record extraction mechanism 120 comprises a cross shaft 122 pivotally mounted near the back end of the player at right angles to, and offset from, the caddy insertion path. Disposed at the opposite ends of the offset shaft 122, and fixedly secured thereto, are a pair of spine releasing members 124 and 126. The spine releasing member 126 is shown in perspective in FIG. 13. The spine releasing members 124 and 126 are each equipped with respective wedge-like portions 128 and 130 which are arranged in the caddy insertion path as shown in FIGS. 5 and 9. When the caddy 50 is inserted into the player, the leading edge of the caddy is transported to the rear of the player, and the wedge-like portions 128 and 130 protrude into the sleeve 54 to deflect the spine locking fingers 64 and 66 in order to release the spine 52 from the sleeve.

The record extraction mechanism 120 further includes a pair of spine latching members 140 and 142 mounted freely on the cross shaft 122 adjacent to the respective spine releasing members 124 and 126. The spine latching member 142 is shown in perspective in FIG. 14. When the caddy 50 is inserted into the player, it engages the hook-like portions 144 and 146 of the spine latching members 140 and 142 to deflect the latching members from their initial positions, shown in FIGS. 5 and 9, to their respective intermediate positions shown in FIGS. 6 and 10. A pair of coil springs 148 and 150, disposed about the offset shaft 122, drive the hook-like portions 144 and 146 into the slots 76 and 78 in the spine 52, in the manner illustrated in FIGS. 6 and 10, to lock the spine to the player.

When the caddy 50 reaches the fully inserted position, it activates a microswitch 152 located at the back end of the player to reverse the function motor 106 to drive the sleeve 54 out until it clears the drive rollers 108, 110, 112 and 114. The sleeve 54 is then manually extracted, leaving the record/spine assembly 60 inside the player resting on a set of record receiving pads 154, 156, 158 and 160.

The spine releasing members 124 and 126 are each equipped with tabs 162 and 164 which are received in the respective cutouts 166 and 168 provided in the spine latching members 140 and 142. When the sleeve 54 is withdrawn, a pair of springs 170 and 172, connecting the spine releasing members 124 and 126 and the spine latching members 140 and 142 together, rotate the spine releasing members away from the spine 52, to the respective interim positions thereof, until the tabs 162 and 164 reengage the respective walls of the cutouts 166 and 168 as can be seen from FIGS. 7 and 11.

A record handling mechanism 180, which is not a part of this invention, is then activated to transfer the retained record 58 from the receiving pads 154, 156, 158 and 160 to a turntable 182, and the turntable motor is turned on. A carriage 184, which houses a stylus cartridge 186, is then advanced by a motor 188 to a position over the turntable 182, and a stylus 190, located in the pickup cartridge, is lowered onto the record 58. During playback, the motor 188 drives the carriage 184 to follow the pickup stylus 190.

At the end of the playback, the carriage drive motor 188 returns the carriage to its starting position. The record 58 is then returned to the receiving pads 154, 156, 158 and 160 by the record handling mechanism 180 to redefine the record/spine assembly 60.

Figure 12:
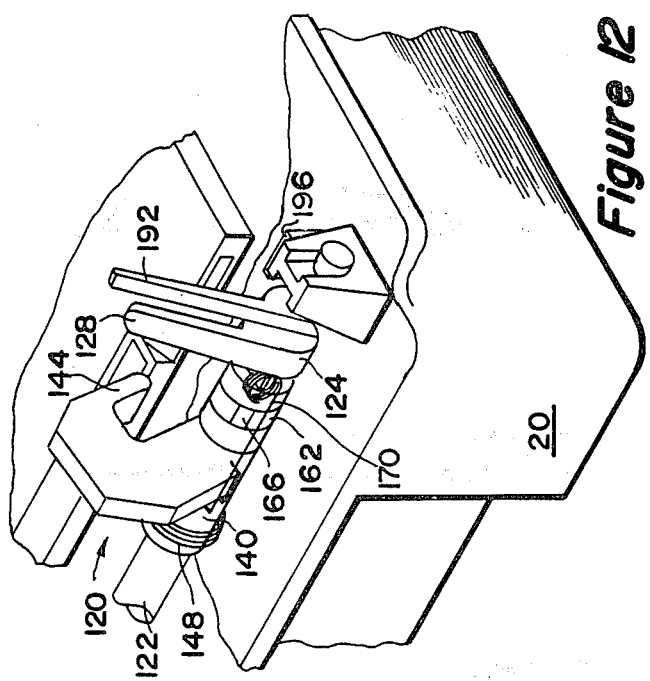
Figure 11:
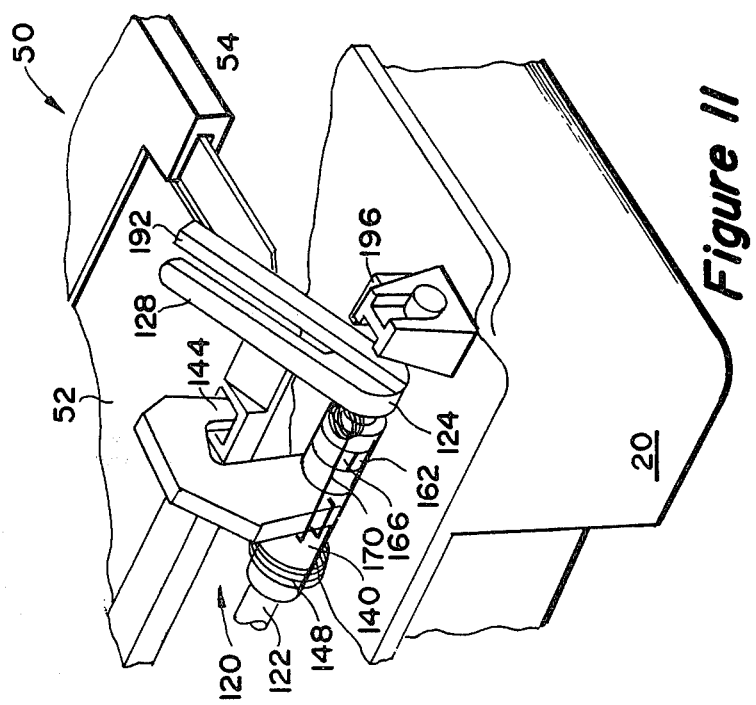

To recapture the record/spine assembly 60 disposed on the receiving pads 154, 156, 158 and 160, the caddy sleeve 54 is reinserted into the player. When the sleeve 54 engages the caddy sense switch 104, the function motor 106 drives the rollers 108, 110, 112 and 114 in a direction that draws in the caddy sleeve. As the caddy sleeve 54 reaches the fully inserted position in the player, its front edge engages and deflects the portions 192 and 194 disposed on the respective spine releasing members 124 and 126 as shown in FIGS. 8 and 12. When the spine releasing members 124 and 126 are rotated by the sleeve 54, the tabs 162 and 164, in turn, press against the respective spine latching members 140 and 142 to lift the hook-like portions 144 and 146 from the slots 76 and 78 in the spine 52 to release the spine. Simultaneously, the spine locking fingers 64 and 66 lock the spine 52 in its sleeve 54.

The function motor 106 is reversed when the sleeve 54 operates the reverse switch 152 to again drive the caddy 50 out until it clears the drive rollers 108, 110, 112 and 114. The caddy 50 is then manually removed from the player.

The springs 148 and 150 reset the spine latching members 140 and 142 to their respective initial positions when the caddy is retrieved from the player. The spine latching members 140 and 142, in turn, restore the spine releasing members 124 and 126 at respective initial positions thereof defined by a stop 196.

The offset location of the cross shaft 122 allows a much larger throw of the spine latching members 140 and 142 when a caddy is inserted into the player as can be seen from FIGS. 5 and 6. This, in turn, provides a much larger deflection of the spine releasing members 124 and 126, when the sleeve is withdrawn from the player, to positively ensure the removal of the spine releasing members from the caddy insertion path in the manner shown in FIGS. 7 and 11. The large deflection of the spine releasing members 124 and 126 makes sure that an empty sleeve, reinserted into the player to retrieve the record, rotates the spine releasing members in a manner causing the spine latching members 140 and 142 to release the spine 52 as shown in FIGS. 8 and 12.

What is claimed is:

1. A record extraction mechanism for use with a caddy consisting of a record retaining spine removably located inside an outer sleeve; said spine having an opening into which a record is received forming a record/spine assembly; said spine further having a finger for releasably locking said spine to said sleeve; said mechanism comprising:
   (A) a housing having an input slot through which a caddy is inserted into said housing along a path;
   (B) a shaft mounted in said housing away from said input slot at right angles to, and offset from, said caddy insertion path;
   (C) a spine releasing member movably mounted on said offset shaft, and having an end thereof disposed in said caddy insertion path when said spine releasing member occupies an initial position; said end of said spine releasing member engaging and deflecting said spine locking finger to release said spine from said sleeve when a caddy is inserted into said housing; said spine releasing member having an actuating portion and a further portion;
   (D) a spine latching member movably mounted on said offset shaft, and having an end thereof arranged in said caddy insertion path when said spine latching member is disposed at an initial position; said end of said spine latching member hookingly engaging said spine to secure it in place when a caddy is inserted into said housing, so that said record/spine assembly is retained inside said housing upon the subsequent withdrawal of said sleeve; engagement of said spine latching member with said spine during said caddy insertion deflecting said latching member from said initial position thereof to an intermediate position;
   (E) biasing means for yieldably maintaining said end of said spine latching member into engagement with said spine; said biasing means additionally serving to locate said spine latching member and spine releasing member against a stop, disposed in said housing, in the absence of occupation of said housing by a record/spine assembly; and
   (F) means for urging said spine releasing member and said spine latching member together for causing said spine releasing member to follow said deflected spine latching member to an interim position when said sleeve is withdrawn from said housing; said further portion of said spine releasing member, occupying said interim position, being disposed in said caddy insertion path;
   an empty sleeve, reinserted into said housing to retrieve said record/spine assembly, contacting and forcing said further portion of said deflected spine releasing member to move away from said spine; said actuating portion of said spine releasing member, in turn, engaging said spine latching member to cause it to rotate in a manner disengaging said spine from said housing during said reinsertion; wherein said spine latching member has a cutout in which said actuating portion of said spine releasing member is received; said actuating portion engaging a wall defining said cutout when said spine releasing member is rotated away from said interim position to effect said disengagement of said spine in response to said reinsertion.

2. The record extraction mechanism as defined in claim 1 wherein the location of said wall of said cutout is such that said wall is in engagement with said actuating portion when said spine latching member and said spine releasing member are disposed at their respective initial positions.

3. The record extraction mechanism as set forth in claim 2 wherein said wall of said cutout is spaced from said actuating portion when said spine latching member is deflected to said intermediate position by said spine and said spine releasing member is held at said initial position by said sleeve; wherein said urging means causes said spine releasing member to rotate until said actuating portion reengages said wall of said cutout when said sleeve is extracted from said housing permitting said spine releasing member to follow said spine latching member to said interim position.

4. The record extraction mechanism as defined in claim 1 for use with a spine having a pair of spaced apart locking fingers disposed at the opposite edges thereof for releasably securing said spine to said sleeve; said record extraction mechanism further comprising:
   (A) a second spine releasing member mounted on said offset shaft, and having an end thereof disposed in said caddy insertion path when said second spine releasing finger occupies an initial position; the location of said second spine releasing member being such that said end thereof engages and deflects one of said spine locking fingers to free said spine from said sleeve as a caddy is inserted into said housing;

(B) a second spine latching member also disposed on said offset shaft, and having an end thereof arranged in said caddy insertion path when said second spine latching member occupies an initial position; the location of said second spine latching member being such that said end thereof hookingly engages said spine to hold it in place when a caddy is inserted into said housing, whereby said record/spine assembly is retained inside said housing as said sleeve is extracted therefrom; and (C) second biasing means for yieldably holding said end of said second spine latching member into engagement with said spine.

5. The record extraction mechanism as outlined in claim 4 wherein engagement of said second spine latching member with said spine during said caddy insertion displaces said second latching member from said initial position thereof to an intermediate position; said record extraction mechanism further including a second means for urging said second spine releasing member and said second spine latching member together for causing said second spine releasing member to follow said displaced second spine latching member to an interim position, when said sleeve is withdrawn.

6. The record extraction mechanism as defined in claim 5 wherein an empty sleeve, reinserted into said housing to retrieve said record/spine assembly, contacts and forces said deflected second spine releasing member to move away from said interim position thereof; said second spine releasing member having an actuating portion which, in turn, engages said second spine latching member to cause it to rotate in a manner freeing said spine.

7. The record extraction mechanism as set forth in claim 6 wherein said second spine releasing member has a further portion which is in said caddy insertion path when said second spine releasing member is occupying said interim position such that an empty sleeve, reinserted into said housing for recapturing said record/spine assembly, engages said further portion to effect rotation of said second spine releasing member away from said interim position thereof to disengage said spine.

8. The record extraction mechanism as set forth in claim 7 wherein said second spine latching member is provided with a cutout in which said actuating portion of said second spine releasing member is received; said actuating portion of said second spine releasing member engaging a wall defining said second-mentioned cutout when said second spine releasing member is rotated away from said interim position thereof to effect said disengagement of said spine.

9. The record extraction mechanism as defined in claim 8 wherein the location of said wall of said cutout in said second spine latching member is such that said wall is in engagement with said actuating portion of said second spine releasing member when said second spine latching member and said second spine releasing member are disposed at their respective initial positions.

10. The record extraction mechanism as set forth in claim 9 wherein said wall of said cutout in said second spine latching member is spaced from said actuating portion of said second spine releasing member when said second spine latching member is deflected to said intermediate position by said spine and second spine releasing member is held at said initial position thereof by said sleeve; wherein said second urging means causes said second spine releasing member to rotate until said actuating portion thereof reengages said wall of said cutout in said second spine latching member when said sleeve is extracted from said housing permitting said second spine releasing member to follow said second spine latching member to said interim position thereof.

11. The record extraction mechanism as defined in claim 10 wherein said offset shaft is rotatably mounted in said housing; said spine releasing members being both fixedly mounted on said shaft for rotation therewith to ensure synchronous movement thereof.

12. The record extraction mechanism as defined in claim 11 wherein said spine latching members are both freely disposed on said offset shaft for motion independent of said shaft; said spine latching members being, in turn, synchronized by the respective one of said spine releasing fingers.

* * * * *